June 24, 1958  F. A. SALANSKY  2,840,426
PISTON PACKINGS

Filed Aug. 16, 1954  2 Sheets-Sheet 1

FRANZ A. SALANSKY
INVENTOR.

BY Wenderoth, Lind and Ponack
ATTYS.

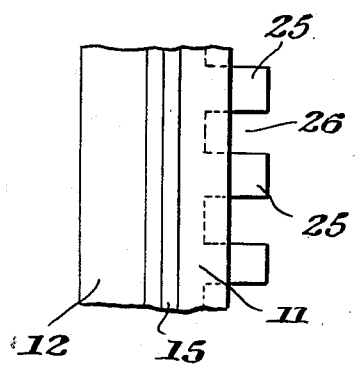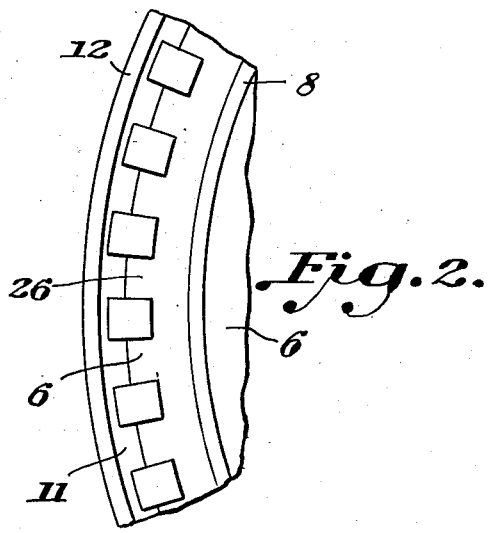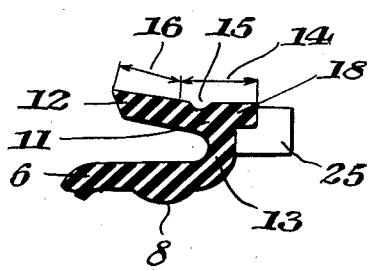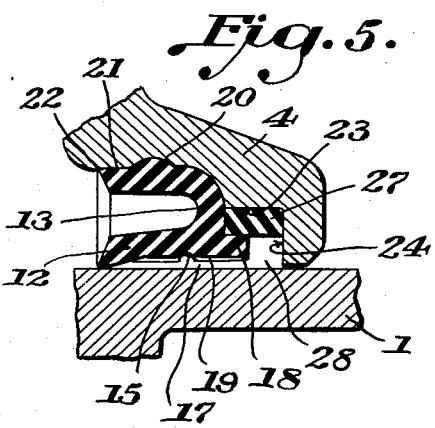
FRANZ A. SALANSKY
INVENTOR.

United States Patent Office 2,840,426
Patented June 24, 1958

2,840,426
PISTON PACKINGS

Franz Anton Salansky, Vienna, Austria, assignor to Technica Establishment, Vaduz, Principality of Liechtenstein Application August 16, 1954, Serial No. 450,013

4 Claims. (Cl. 309—4)

This invention relates to packings for pistons operating in cylinders and particularly to packings for pistons used in brake cylinders of pneumatic pressure brake equipment.

It is an object of the invention to improve the performance of piston packings of the kind made of elastic, resilient material such as rubber and provided with a peripheral flange forming a sealing lip which extends towards the pressure face of the piston and slidably engages the wall of the cylinder in which the piston operates. For a specific example of piston packings of this kind whose performance can be considerably improved by modifying them into accordance with this invention, reference may be had to the U. S. Patent No. 2,055,104 granted September 22, 1936, to Ellis E. Hewitt et al.

Packings of suitable synthetic rubber and substantially of the construction disclosed in the said U. S. Patent No. 2,055,104 and particularly in Figs. 5–7 thereof, are now widely used for the pistons in the brake cylinders of pneumatic pressure brake equipment. Formerly, packings of impregnated leather were used. While leather packings suffer from some drawbacks among them the drawback of the leather becoming stiff and brittle at low temperatures, the rubber packings now widely used instead of leather packings have been found to wear out more rapidly or to require more frequent cleaning and relubrication of the brake cylinders than the leather packings did. The cause for this is that packings of rubber or similar flexible, non-porous material have a more pronounced tendency than leather packings to wipe off the grease from the cylinder wall and leave it dry, and the ensuing dry rubbing of the packing against the cylinder wall will cause a rapid deterioration of the packing. For this reason it is present practice to provide special means in the form of a felt ring saturated with grease and acting more or less as a wick for spreading a new film of grease over the cylinder wall with each application and release movement of the piston, in replacement of the grease wiped off. But also this arrangement calls for a relubrication of the cylinder and a resaturation of the felt ring with grease at not too long intervals. It is an object of this invention to provide a new and useful piston packing of rubber or similar elastic and resilient material, which will act as an effective seal for the piston against the pneumatic pressure and which nevertheless will permit the cylinder wall to stay well lubricated for unexpectedly long periods of time.

Further objects of the invention and its novel features will appear from the following description of preferred forms of the invention which are illustrated on the accompanying drawings in which:

Fig. 2 is a fragmentary view of the non-pressure face of the rubber packing for the piston shown in Fig. 1;

Fig. 3 is a fragmentary side view of the piston packing shown in Figs. 1 and 2;

Fig. 4 is a longitudinal sectional view through the peripheral sealing lip and adjacent portions of the rubber packing for the piston shown in Figs. 1 and 2;

Fig. 5 illustrates a modified form of piston and packing device and is a longitudinal sectional view through a portion thereof and the adjacent portion of the cylinder wall.

Figure 1:
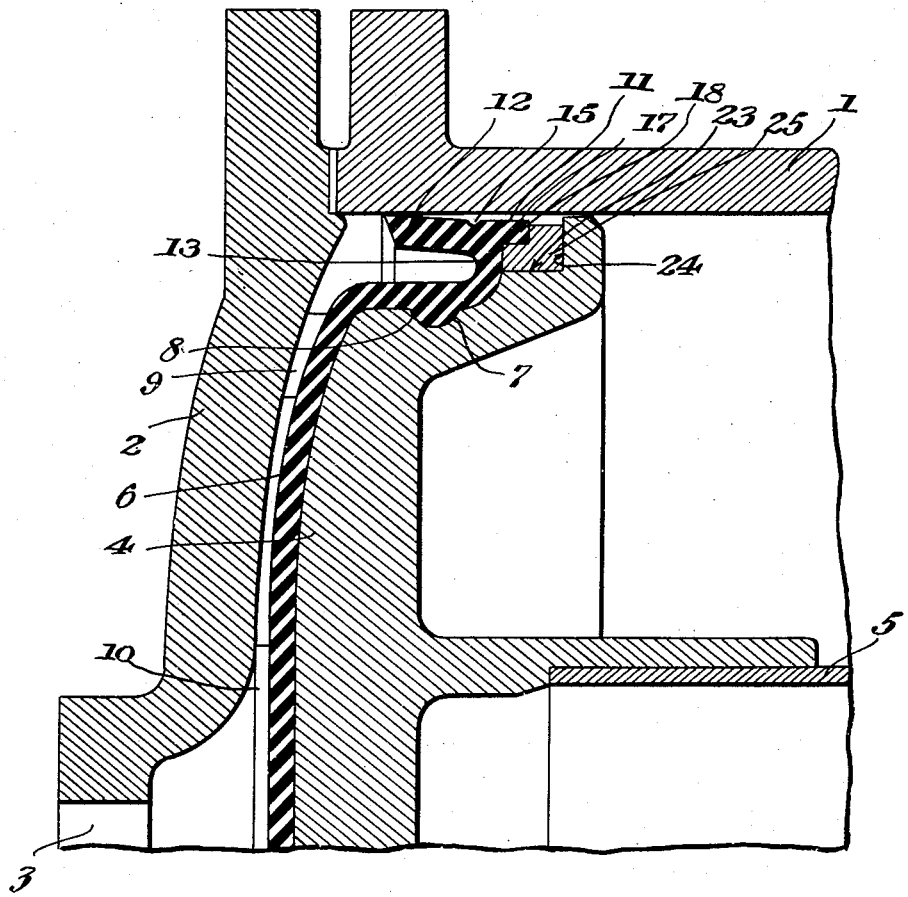
Fig. 1 is a longitudinal sectional view through a portion of a brake cylinder and piston device embodying features of the invention.

Referring to the drawings and particularly to Fig. 1, the device illustrated therein comprises a brake cylinder 1 provided with the pressure head 2 having an opening 3 which receives the brake cylinder pipe or a fitting therefor (not shown). The piston 4 operating in the brake cylinder is equipped with the usual sleeve 5 for receiving the usual push rod (not shown) which is connected to the levers and rods of the foundation brake rigging when installed on a railway car. The brake cylinder and piston and their accessories, except novel features of or in connection with the packing for the piston, can be taken as being of a well-known standard construction already in wide use.

The piston packing illustrated in Fig. 1 comprises a cup 6 of the now usual "snap-on" type which completely covers the pressure face of the piston 4 whose circumference is machined so as to provide an annular groove 7 into which an annular bead 8 on the inside of the circumferential wall of the packing cup is snapped. This method of retaining the packing in place on the piston is standard. Standard is also the provision of spaced lugs or ribs 9 and 10 on the face of the cup facing the pressure head 2 to permit compressed air entering the cylinder through the opening 3 to act immediately on the pressure face of the packing substantially throughout its entire area. In these respects reference may be had to the aforesaid U. S. Patent No. 2,055,104 and particularly to Figs. 5, 6 and 7 thereof. As will be described ltaer on, the essential features of the invention are inherent in the peripheral flange 11, a portion of which constitutes the sealing lip 12 which extends towards the pressure face of the piston 4 and slidably engages the wall of the cylinder 1. This peripheral flange 11 and the cup 6 are integrally joined by a more or less flange-like portion 13 of the packing material, which extends outwardly from the cup 6 substantially in a plane perpendicular to the longitudinal axis of the cylinder and piston device. The pressure face of the circumferential wall of the cup 6, the peripheral flange 11 and the integrally joining portion 13 of the packing material preferably may form a U-bend more or less similar to that of the present standard construction of piston packings of the kind herein concerned.

In present practice and standard the construction of piston packings of the kind herein concerned is such that the peripheral flange constituting the sealing lip (the peripheral flange or fold 18 in the aforementioned U. S. Patent No. 2,055,104) is normally flared outwardly so that when the packing is mounted in place on the piston and inserted within the cylinder, the said peripheral flange is forced substantially throughout its entire axial length into contact with the wall of the cylinder by the tendency of the elastic resilient material of the packing to return to its original shape. Whilst a packing constructed so as to force its peripheral flange constituting the sealing lip substantially throughout its entire axial length into sealing contact with the wall of the cylinder, has a marked tendency of wiping off the lubricant from the cylinder wall, so that special means such as a felt ring saturated with grease must be provided and special care such as relatively frequent cleaning and relubrication of the brake cylinders must be taken to maintain the cylinder wall in a lubricated state for preventing dry rubbing and rapid deterioration of the sealing lip, the present invention consists in a construction which differs radically from the just recited present practice and standard as regards the relation of the peripheral flange forming the sealing lip to the wall of the cylinder when inserted therewithin, and which has been found to permit the cylinder wall to stay sufficiently lubricated for unexpectedly long periods of time and thus eliminates the necessity of such relatively frequent cleaning and relubrication of the brake cylinders as otherwise is an indispensable condition for the reliable performance of piston packings of the kind herein concerned.

As will be seen from Fig. 1 in comparison with Fig. 4 which latter is a sectional view of the peripheral portion of the packing in its original shape, i. e. not yet inserted in the cylinder, this peripheral portion of the packing is so constructed that, when placed within the cylinder, the peripheral flange 11 leaves between it and the cylinder wall a significant annular space which is open at the non-pressure end of the peripheral flange 11 and extends therefrom throughout the greater part of the axial length of the flange 11 and is closed at the pressure end thereof by the sealing lip 12, there contacting the cylinder wall. This implies that the peripheral flange 11 in its original shape throughout the said greater part of its length is distinctly and significantly smaller in outer diameter than is the cylinder 1 in inner diameter. Preferably the construction may be such that the outer circumference of the flange 11 is cylindrical throughout the part of the axial length thereof marked 14 in Fig. 4, except for an annular grease groove 15 being provided in this cylindrical part of the outer circumference of the flange 11. This grease groove 15 preferably is disposed approximately in a plane perpendicular to the longitudinal axis of the cylinder and piston device and tangential to the pressure face of the flange-like portion 13 integrally uniting the flange 11 and the cup 6 of the packing. Throughout the rest of its axial length, marked 16 in Fig. 4, the flange 11 is normally flared outwardly so that, when inserted within the cylinder, merely the pressure end portion of the flange 11 forms the sealing lip 12 which is forced into sealing contact with the cylinder wall by the tendency of the material of the packing to return to its original shape. Thus the annular space 17 which is formed between the peripheral flange 11 of the packing and the cylinder wall, extends axially from the non-pressure end of the flange 11 to a point adjacent the pressure end of the flange 11 where the gradual approach of the outwardly flaring portion of the flange 11 towards the cylinder wall brings the sealing lip 12 into sealing contact with the cylinder wall. This point will be displaced towards the annular grease groove 15, at the utmost up to this groove, by the action of the pneumatic pressure on the pressure face of the packing during braking. This implies that the peripheral portion of the packing must be constructed so that a portion of the peripheral flange 11, extending axially from the non-pressure end of the flange at least to and preferably beyond the grease groove 15, is capable of so withstanding the outwardly directed forces exerted on the pressure face of the flange 11 even by the highest pneumatic pressure acting thereon during braking that the flange 11 throughout the said portion of its axial length will not yield so much to said forces as to be forced by them into contact with the cylinder wall. Thus the annular space 17 between the flange 11 and the cylinder wall will not vanish but only diminish somewhat in volume and possibly also in axial length during the increase of the pneumatic pressure on the pressure face of the piston at an application of the brakes. If the annular space 17 which includes the annular grease groove 15 is filled with lubricant such as ordinary brake cylinder grease, the decrease in volume of the annular space 17 occuring during an application stroke of the brake piston 4 in the cylinder 1 will act to press the lubricant in the annular space 17 against and along the cylinder wall and probably to some extent out from the annular space 17 through the open non-pressure end thereof. It may be mentioned as a theory of no limiting or binding effect on the invention or on the scope of the appended claims, that what happens during the application and release movements of the piston 4 in the cylinder 1 and is the cause of the manifest improvement of the performance of piston packings of the kind herein concerned when modified in accordance with the present invention, is not only the just described action of the reduction in volume of the grease-filled annular space 17 occurring during the application stroke of the piston 4, but also a re-depositing or re-collecting of surplus lubricant from the cylinder wall into the annular space 17 during the release stroke of the piston 4. The tendency of the elastic, resilient material of the packing to return to its original shape when the pneumatic pressure that caused the decrease in volume of the annular space 17 ceases, will cause a return of the annular space 17 to its original volume during the release stroke of the piston 4, and this increase in volume of the annular space 17 will produce suction therein, which probably causes a sucking in of surplus lubricant from the cylinder wall into the annular space 17 through the open non-pressure end thereof. This may be the cause of the established fact that the annular space 17 will stay filled with a supply of lubricant for an unexpectedly long period of time and the reason why the supply of lubricant is not rather soon wiped off from the cylinder wall and scattered to places where it is lost for the purpose of keeping the cylinder wall in a lubricated state.

It has been found preferable to extend the peripheral flange 11 beyond the flange-like portion 13 towards the non-pressure face of the piston 4, and such an extension 18 is shown on the drawings and serves the purpose of extending the axial length of the annular space 17 to a suitable value and of relieving the portion of the flange 11 remote from the sealing lip 12 from the direct action of the pneumatic pressure admitted to the brake cylinder on braking. The extension 18 thus aids in preventing the said pneumatic pressure from pressing the portion of the flange 11 remote from the sealing lip 12 into contact with the cylinder wall and thus in maintaining the annular space 17 between the said portion of the flange 11 and the cylinder wall during braking. It is preferable to provide a support on the piston 4 for the non-pressure face of the flange-like portion 13 of the packing and for the inner periphery of the extension 18 of the flange 11.

The material of the piston packing of this invention preferably may be a rather soft quality of a synthetic rubber which is resistant to the brake cylinder lubricant to be used and which maintains its softness, flexibility and resiliency even at rather low temperatures. Reinforcing fabric embedded in the rubber has been found unnecessary but may be used if desired as an aid in imparting the desired properties to the packing.

As is shown in Fig. 5, the flange 11 in its side facing the wall of the cylinder 1 may be provided with longitudinally disposed grooves 19 extending from the non-pressure end of the flange 11 up to or more or less beyond the location of the shown annular groove 15 but not up to the pressure end or sealing lip 12 of the flange 11. In Fig. 5 there is also shown a modified form of that portion of the packing which serves the purpose of retaining it in place on the piston 4 and with which the peripheral flange 11 of the packing is integrally united by the flange-like portion 13 of the packing. As shown in Fig. 5, the retaining portion 20 of the packing is in the shape of a ring for which there is provided in the peripheral portion of the piston 4 a shallow annular groove 21 providing on the piston a shoulder 22 over which the packing ring is expanded and snapped into place. It is to be noted, however, that the construction of the retaining portion of the packing forms no part of this invention and may be varied as desired.

In addition to such novel features as have been described in the foregoing and to which the appended claims are directed, further novel features appear from the drawings and will be described in the following for the reason that they have been found to be useful in connection with, and to exert an improving effect on, the invention described and claimed herein. These further novel features now to be described cannot be claimed herein for the reason that they are the communicated but not yet published invention of another, namely Bert Henry Browall, a citizen of Sweden, residing at Malmo, Sweden.

In a widely used construction (the Westinghouse type AB brake cylinder) of the brake cylinder and piston device of pneumatic pressure brake equipment, using as standard a piston packing cup of the kind described in the aforementioned U. S. Patent No. 2,055,104, there is also used as standard and as a remedy for maintaining the lubrication of the cylinder wall against the wiping-off effect of the sealing lip of the packing, a steel stamping in the form of a ring with a cross-section in the shape of a U-bend with its opening facing outwards, towards the cylinder wall. This steel stamping is placed in an annular recess in the piston, on the non-pressure side of the packing, and one of the walls of the U-bend of the steel stamping is curved to form a support for the facing U-bend of the packing which, because of the said recess in the piston, otherwise would have no support. In a separate ring within the U-bend of the steel stamping is held a felt swab. These features, although not described in the cited U. S. Patent No. 2,055,104, are clearly illustrated in Fig. 7 thereof immediately to the left of the U-bend of the packing cup. The free space left within the U-bend of the steel stamping forms a groove which is intended to be filled with cylinder wall lubricant with which also the felt swab is intended to be saturated for the purpose that from this supply of lubricant with each stroke of the piston in the cylinder a new film of grease should be spread over the cylinder wall in replacement of the grease wiped off.

The standard construction of the piston and packing device just recited does not permit the packing cup thereof to be replaced by the packing cup of the present invention without further ado, that is without any other change, because the extension 18 of the flange 11 calls for an additional axial space, namely a part of the space occupied by the aforesaid steel stamping of the standard construction. The requisite additional axial space for the extension 18 of the flange 11 could conceivably be provided for by a corresponding reduction of the outer diameter of the curved wall portion of the steel stamping, but an undesirable effect of such a change would be that the remaining greatly reduced grease groove would be blocked off by the extension 18 of the peripheral flange 11 of the packing.

A practical and good solution of the problem of providing a packing cup which is constructed in accordance with the invention hereinbefore described and claimed in the appended claims and which is easily mountable on the piston of the hereinbefore recited standard construction in replacement of the standard packing cup thereof, has been attained by entirely dispensing with the steel stamping and the felt swab of the standard piston and packing device and making other use of the recess provided for them in the circumference of the piston. In Figs. 1 and 5 the cylindrical wall and the end wall of said recess are denoted with the numerals 23 and 24, respectively. The extension 18 of the flange 11 is allowed to project into said recess and thus can be made as long as is required for obtaining the desirable axial length of the narrow annular space 17 between the flange 11 and the cylinder wall. The rest of the said recess in the piston is partly filled with one or more bodies of such a construction that they give the desirable support to the extension 18 of the flange 11 and as well to that portion of the flange 13 which projects radially outwards beyond the cylindrical wall 23 of the recess. The remainder of the recess thus not filled up constitutes a continuous space or series of intercommunicating spaces in direct communication with the narrow annular space 17, and all these spaces are intended to be filled with cylinder wall lubricant. As shown in Figs. 1 to 4, when using a plurality of filler bodies 25, these are preferably moulded integrally with the peripheral portion of the packing cup and given the shape of peripherally interspaced protuberances projecting axially from the peripheral portion of the packing cup on the non-pressure side thereof and extending axially to the end wall 24 of the recess in the piston 4 and radially from the cylindrical wall 23 outwards, but not fully up to the outer diameter of the portion of the flange 11 remote from the sealing lip 12. The spaces 26 between the protuberances 25 constitute the said intercommunicating spaces in direct communication with the annular space 17.

In Fig. 5 there is shown a single, annular filler body 27 entirely covering the cylindrical wall 23 of the recess in the piston 4 but filling only part (about half) of the radial extension of the recess, thus leaving a continuous space or annular groove 28 in direct communication with the narrow annular space 17. Instead of being made as a separate ring also the continuous filler body 27 may be moulded integrally with the packing. In any case, preferably a somewhat harder quality of rubber composition is used for the filler body or bodies than for the packing, although a certain degree of elasticity and resiliency also of the filler body or bodies is a desirable feature. The grease-filled space (28, Fig. 5) or spaces (26, Figs. 2 and 3) will then be slightly reduced in volume during application of the brakes due to the pneumatic pressure on the pressure face of the piston packing trying to force the peripheral portion thereof towards the end wall 24 of the recess in the piston 4, whereby a small quantity of lubricant will be forced out of the space or spaces 28 or 26, respectively. At the release of the brakes, the said space or spaces will expand again, which results in a sucking action supplementing the sucking action which is produced in the narrow annular space 17, and aiding in bringing surplus grease from the cylinder wall back again into the space or spaces in the recess in the piston and into the annular space 17 between the peripheral flange 11 of the packing and cylinder wall.

What I claim and desire to secure by Letters Patent is:

1. A packing for use with a piston slidable in a cylinder, said packing comprising means for attaching it over the pressure receiving end of the piston, a flange-like portion projecting substantially radially outwardly from said attaching means, and a peripheral flange on the outer periphery of said flange-like portion extending in the axial direction of said flange-like portion in both directions from said flange-like portion, the part of said peripheral flange extending toward the direction from which pressure is to be applied to said packing being flared outwardly, and the part of said peripheral flange extending away from the direction from which pressure is to be applied having an outer diameter less than the average diameter of the outwardly flared part of said peripheral flange when said outwardly flared part is under pressure, said peripheral flange having a groove in the outer surface thereof between the parts, said packing being resilient such that when pressure is applied thereto the part of said peripheral flange extending in the direction away from the direction in which pressure is to be applied continues to have a diameter less than the average diameter of the outwardly flared part.

2. A packing for use with a piston slidable in a cylinder, said packing comprising means for attaching it over the pressure receiving end of the piston, a flange-like portion projecting substantially radially outwardly from said attaching means, and a peripheral flange on the outer periphery of said flange-like portion extending in the axial direction of said flange-like portion in both directions from said flange-like portion, the part of said peripheral flange extending toward the direction from which pressure is to be applied to said packing being flared outwardly from a diameter less than will be occupied by the peripheral flange when pressure is applied to it to a diameter greater than will be occupied by the peripheral flange when pressure is applied to it, and the part of said peripheral flange extending away from the direction from which pressure is to be applied having an outer diameter less than the average diameter of the outwardly flared part of said peripheral flange when said outwardly flared part is under pressure, said peripheral flange having a groove in the outer surface thereof between the parts, said packing being resilient such that when pressure is applied thereto the part of said peripheral flange extending in the direction away from the direction in which pressure is to be applied continues to have a diameter less than the average diameter of the outwardly flared part.

3. In combination, a cylinder, a piston slidable in said cylinder and having a pressure face with a diameter less than that of said cylinder, and a packing for said cylinder and piston comprising an annular member attached to said piston around said pressure face and of less diameter than said cylinder, a flange-like portion projecting substantially radially outwardly from said annular member, and a peripheral flange on the outer periphery of said flange-like portion extending in an axial direction of said cylinder in both directions from said flange-like portion, the part of said peripheral flange extending toward the direction from which pressure is to be applied to said packing being flared outwardly into contact with said cylinder, and the part of said peripheral flange extending away from the direction from which pressure is to be applied having an outer diameter less than the inside diameter of said cylinder, said peripheral flange having a groove in the outer surface thereof between the parts thereof, said packing being resilient such that when pressure is applied thereto the part of said peripheral flange extending in the direction away from the direction from which pressure is applied continues to have a diameter less than the inside diameter of said cylinder.

4. In combination, a cylinder, a piston slidable in said cylinder and having a pressure face with a diameter less than that of said cylinder, and a packing for said cylinder and piston comprising an annular member attached to said piston around said pressure face and of less diameter than said cylinder, a flange-like portion projecting substantially radially outwardly from said annular member, and a peripheral flange on the outer periphery of said flange-like portion extending in an axial direction of said cylinder in both directions from said flange-like portion, the part of said peripheral flange extending toward the direction from which pressure is to be applied to said packing being flared outwardly into contact with said cylinder from a diameter less than the inside diameter of said cylinder and the part of said peripheral flange extending away from the direction from which pressure is to be applied having an outer diameter less than the inside diameter of said cylinder, said peripheral flange having a groove in the outer surface thereof between the parts thereof, said packing being resilient such that when pressure is applied thereto the part of said peripheral flange extending in the direction away from the direction from which pressure is applied continues to have a diameter less than the inside diameter of said cylinder.

References Cited in the file of this patent

UNITED STATES PATENTS

| Number | Name | Date |
|---|---|---|
| 2,029,367 | Geyer | Feb. 4, 1936 |
| 2,055,104 | Hewitt et al. | Sept. 22, 1936 |
| 2,194,732 | Aikman | Mar. 26, 1940 |
| 2,196,337 | Loweke | Apr. 9, 1940 |
| 2,307,671 | Dodge | Jan. 5, 1943 |
| 2,428,452 | Farmer | Oct. 7, 1947 |
| 2,459,562 | La Brie | Jan. 18, 1949 |